A. L. McCALLUM.
HAND BRAKE FOR BOX CARS.
APPLICATION FILED JUNE 21, 1915.

1,167,576.

Patented Jan. 11, 1916.
2 SHEETS—SHEET 1.

Inventor
Albert L. McCallum
By L. L. Westfall
Attorney

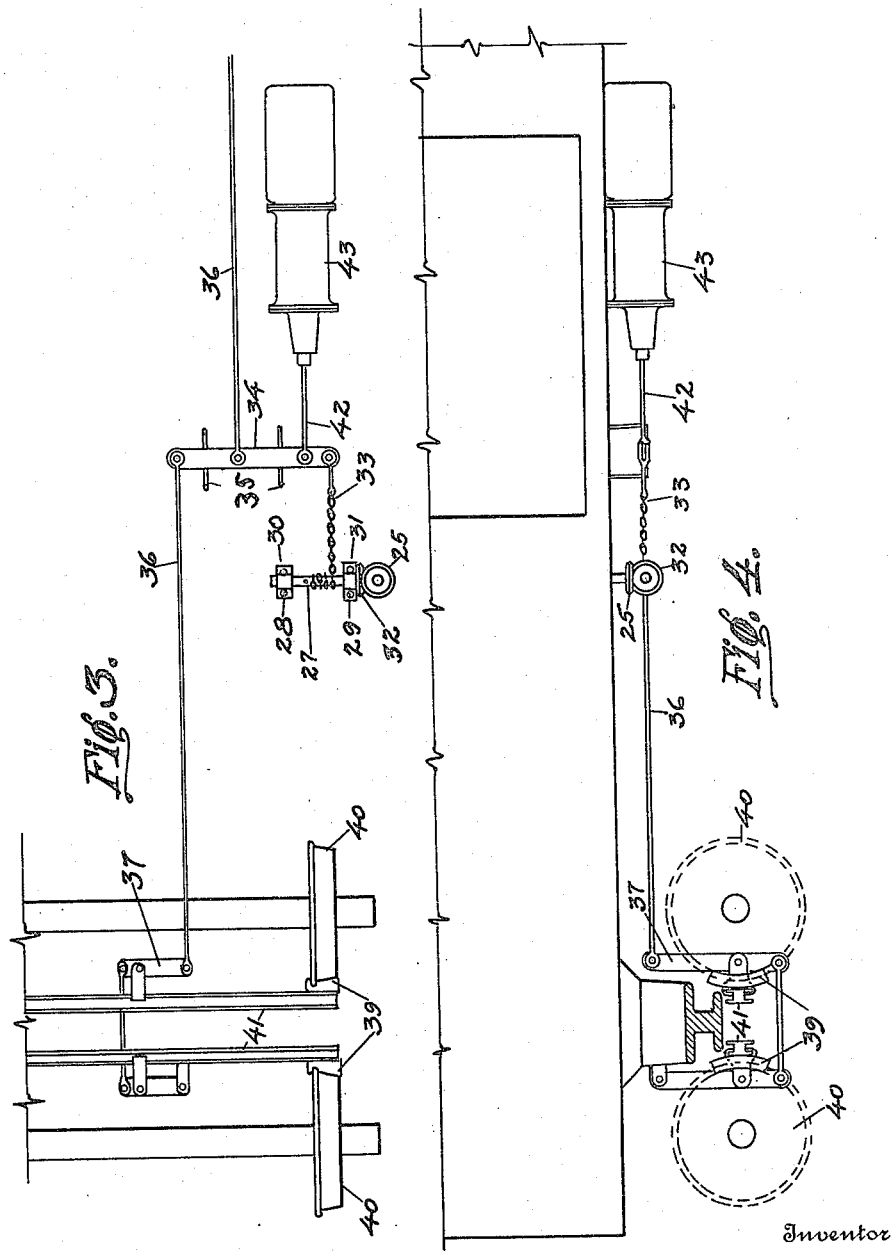

UNITED STATES PATENT OFFICE.

ALBERT L. McCALLUM, OF SPOKANE, WASHINGTON.

HAND-BRAKE FOR BOX-CARS.

1,167,576.   Specification of Letters Patent.   Patented Jan. 11, 1916.

Application filed June 21, 1915. Serial No. 35,239.

*To all whom it may concern:*

Be it known that I, ALBERT L. McCALLUM, a citizen of the United States of America, residing at Spokane, in the county of Spokane and State of Washington, have invented certain new and useful Improvements in Hand-Brakes for Box-Cars, of which the following is a specification.

This invention pertains to hand brakes for freight cars and has for its object to provide means whereby the brake wheel is set near the center of the top of the car instead of at the end thereof as is usual, the purpose being to make more safe the life and limb of the brakemen employed in the service.

The construction and operation of parts will be hereinafter particularly described and illustrated in the accompanying drawings, in which—

Figure 2:
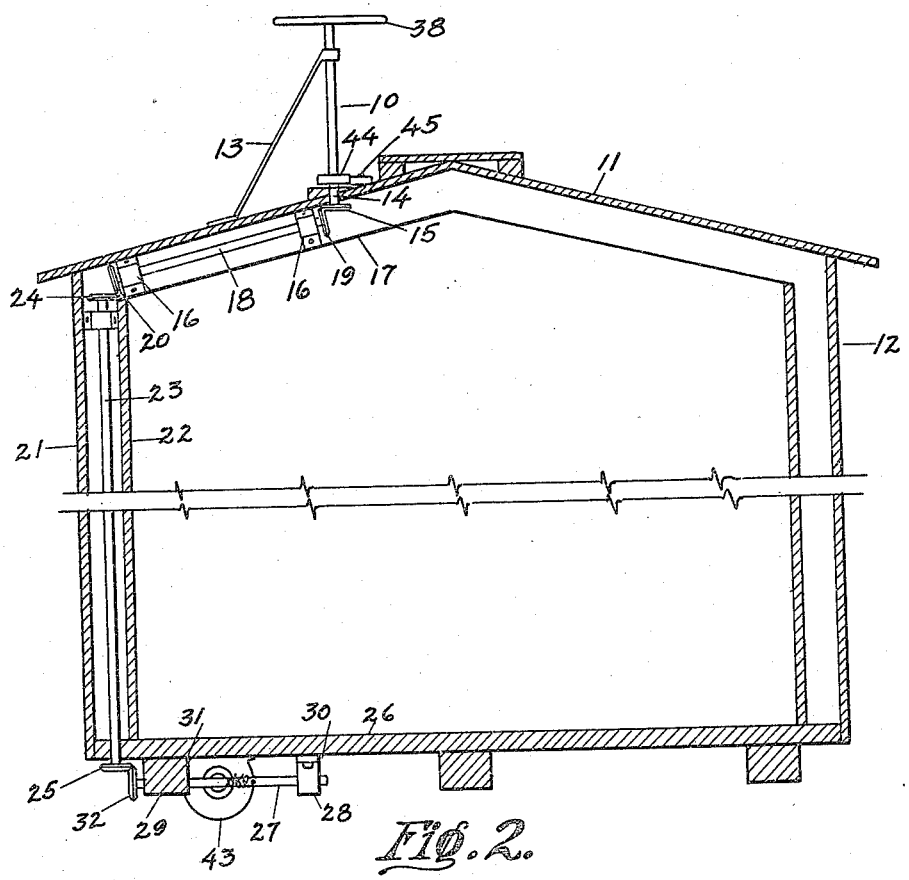
Figure 1:
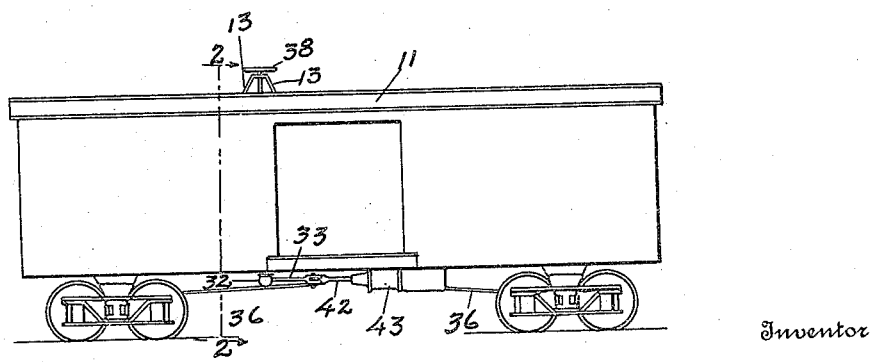

Figure 1 is a side elevation of a box car equipped with my improved brake, Fig. 2 is a sectional view taken on the line 2—2 of Fig. 1, Fig. 3 is a broken-away plan view of a car truck showing the brake and connections, and Fig. 4, is a broken-away side view of a box car showing the brake and connections and showing the car wheels in dotted lines.

In a detail description of parts in which like numerals refer to like parts throughout the several views, a brake wheel shaft 10 is mounted on the top 11 of a box car 12 and supported by brackets 13. The shaft 10 extends through the top 11 of the box car 12 at 14 and carries a gear 15 on the end thereof. Mounted underneath the roof 11 of the car 12 and journaled in the bearings 16 secured to a beam 17 is a shaft 18 carrying gears 19 and 20, the former gear meshing with the gear 15 at the end of the shaft 10. Mounted vertically between the outer and inner walls 21 and 22 of the car 12 is a shaft 23 carrying gears 24 and 25, the former gear meshing with the gear 20 at the end of the shaft 18. Horizontally mounted transversely across the car 12 underneath the floor 26 thereof is a shaft 27, the same being journaled in the bearings 28 and 29 attached to the under surface of the bottom 26 of the car 12 at 30 and 31 respectively.

The shaft 27 carries a gear 32 which meshes with the gear 25 at the end of the shaft 23. A chain 33 is attached at one end to the shaft 27 and at the other end to a floating beam 34 held in position by brackets 35 having rod connections 36 reaching to and connecting with brake levers 37. By the turning of the brake wheel 38 through the connections of the shafts 10 and 23 and the gears 15, 19, 20, 24, 25 and 32 the shaft 27 is rotated, thereby drawing on the chain 33, which draws on the rods 36, thereby operating the levers 37, thereby setting the brake shoes 39 against the wheels 40. The brake beams 41 and other brake mechanism in connection with the car trucks is of ordinary construction and is not claimed herein as new and it is therefore thought not necessary to particularly describe the same herein.

Where air brakes are used on cars of the character mentioned the piston rod 42 connects with the beam 34 and extends into the cylinder 43. The piston rod 42 has a free action in the cylinder 43 and therefore will not interfere with the free action of the beam 34 in connection with the hand brake described.

The brake wheel shaft 10 is provided with a ratchet wheel 44 and a pawl 45 is adapted to engage the same as a means for retaining the shaft 10 as against rotation.

What is claimed is,

1. A hand brake mechanism for box cars comprising a brake wheel shaft mounted on the top of the car and extending through the top thereof and having a gear at the bottom thereof, a shaft journaled to a permanent position underneath the top of the car and having a gear at each end thereof, one of said gears meshing with the gear at the end of the brake wheel shaft, a vertically arranged shaft at the side of the car having a gear at each end thereof, the outer one of said gears meshing with the gear on the end of the shaft journaled underneath the top of the car, a shaft journaled to a permanent position underneath the floor of the car and having a gear on the end thereof meshing with the gear on the lower end of said vertically arranged shaft, a connection between said shaft on the under side of the floor of the car and a floating beam adapted to be operated to set and release brake shoes.

2. A hand brake mechanism for box cars comprising a brake wheel and shaft rotatably mounted near the center of the top of a box car, a shaft horizontally arranged and transversely journaled to the floor of the car on the under side thereof and adapted to rotate, a connection between said shaft and the brake levers of the trucks of the car, and shaft and gear connections across the top and down the side of the car from the brake wheel shaft on the top of the car to the horizontally arranged shaft on the bottom of the car.

In testimony whereof I have affixed my signature in presence of two witneses.

ALBERT L. McCALLUM.

Witnesses:
L. L. WESTFALL,
WILLIAM H. KAYE.